(12) United States Patent
Prakash et al.

(10) Patent No.: US 8,098,662 B2
(45) Date of Patent: *Jan. 17, 2012

(54) METHOD AND APPARATUS FOR USING SHORT ADDRESSES IN A COMMUNICATION SYSTEM

(75) Inventors: Rajat Prakash, San Diego, CA (US); Fatih Ulupinar, San Diego, CA (US); Gavin Horn, La Jolla, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 922 days.

This patent is subject to a terminal disclaimer.

(21) Appl. No.: 11/759,858

(22) Filed: Jun. 7, 2007

(65) Prior Publication Data
US 2008/0008111 A1 Jan. 10, 2008

Related U.S. Application Data

(60) Provisional application No. 60/812,011, filed on Jun. 7, 2006, provisional application No. 60/812,012, filed on Jun. 7, 2006.

(51) Int. Cl.
*H04L 12/28* (2006.01)
*H04L 12/56* (2006.01)
(52) U.S. Cl. .................. 370/392; 370/471; 370/474
(58) Field of Classification Search .................. None
See application file for complete search history.

(56) References Cited

U.S. PATENT DOCUMENTS

| | | | |
|---|---|---|---|
| 6,038,233 A | * | 3/2000 | Hamamoto et al. ........ 370/401 |
| 6,115,394 A | * | 9/2000 | Balachandran et al. ...... 370/477 |
| 6,122,671 A | | 9/2000 | Farrar, Jr. et al. |
| 6,480,527 B1 | | 11/2002 | Kim et al. |
| 6,487,602 B1 | | 11/2002 | Thakker |

(Continued)

FOREIGN PATENT DOCUMENTS

CA 2646082 A1 12/2007

(Continued)

OTHER PUBLICATIONS

R. Hinden and S. Deering, RFC 4291, IP Version 6 Addressing Architecture, Feb. 2006, The Internet Society, pp. 13-15.*

(Continued)

*Primary Examiner* — Gregory Sefcheck
*Assistant Examiner* — Ashley Shivers
(74) *Attorney, Agent, or Firm* — Darren M. Simon; Uilan Patel

(57) ABSTRACT

Methods and apparatus for communicating between an access terminal (AT) and remote device via an access point (AP) are described. For communications over the air link, between an AP and an AT, a short address corresponding to the remote device is used for routing packets to/from the remote device. This conserves air link resources. However, for communicating between the AP and the remote device a longer address, e.g., a full IP address corresponding to the remote device, is used. The AT converts between the long and short addresses as information, e.g., packets, is communicated between the remote device and the AT. The long address may be, for example, an IP address corresponding to the remote device used to route packets through a Layer 2 tunnel between the remote device and the AP. In some embodiments the remote device is a remote access point.

70 Claims, 10 Drawing Sheets

U.S. PATENT DOCUMENTS

| | | |
|---|---|---|
| 6,625,145 B1 | 9/2003 | Winell |
| 6,697,354 B1 | 2/2004 | Borella et al. |
| 6,717,956 B1 | 4/2004 | Fan et al. |
| 6,738,366 B1 | 5/2004 | Etemad et al. |
| 6,822,957 B1 | 11/2004 | Schuster et al. |
| 7,016,328 B2 | 3/2006 | Chari et al. |
| 7,170,871 B2 | 1/2007 | Eyuboglu et al. |
| 7,221,651 B2 | 5/2007 | Mizoguchi et al. |
| 7,453,852 B2 | 11/2008 | Buddhikot et al. |
| 7,505,432 B2 | 3/2009 | Leung et al. |
| 7,609,701 B2 | 10/2009 | Yang et al. |
| 7,639,686 B2 * | 12/2009 | Wetterwald et al. .......... 370/392 |
| 7,715,413 B2 | 5/2010 | Vaziri et al. |
| 2002/0058480 A1 | 5/2002 | Ikeda |
| 2002/0191567 A1 | 12/2002 | Famolari et al. |
| 2003/0009561 A1 | 1/2003 | Sollee |
| 2003/0161319 A1 | 8/2003 | Okagawa et al. |
| 2004/0005894 A1 | 1/2004 | Trossen et al. |
| 2004/0097232 A1 * | 5/2004 | Haverinen .................... 455/436 |
| 2004/0156346 A1 * | 8/2004 | O'Neill ......................... 370/338 |
| 2004/0167988 A1 | 8/2004 | Rune et al. |
| 2004/0213274 A1 | 10/2004 | Fan et al. |
| 2004/0255331 A1 | 12/2004 | Inoue et al. |
| 2005/0010686 A1 | 1/2005 | Nishida et al. |
| 2005/0084079 A1 | 4/2005 | Lang |
| 2005/0141515 A1 | 6/2005 | Mangin et al. |
| 2005/0190818 A1 | 9/2005 | Sunaga et al. |
| 2005/0259654 A1 | 11/2005 | Faulk, Jr. |
| 2006/0098644 A1 | 5/2006 | Pullela et al. |
| 2006/0209759 A1 * | 9/2006 | Vesterinen .................... 370/331 |
| 2006/0234636 A1 | 10/2006 | Miller et al. |
| 2006/0270437 A1 | 11/2006 | Ueda et al. |
| 2007/0047583 A1 | 3/2007 | Assa et al. |
| 2007/0189309 A1 | 8/2007 | Bosch et al. |
| 2008/0267186 A1 | 10/2008 | Boukis et al. |

FOREIGN PATENT DOCUMENTS

| | | |
|---|---|---|
| CA | 2648119 A1 | 12/2007 |
| CA | 2648122 A1 | 12/2007 |
| CA | 2651551 A1 | 12/2007 |
| CN | 1437809 A | 8/2003 |
| EP | 0594196 A1 | 4/1994 |
| EP | 1445919 | 8/2004 |
| GB | 2415855 A | 1/2006 |
| JP | 2001244937 A | 9/2001 |
| JP | 2002534911 T | 10/2002 |
| JP | 2002534922 A | 10/2002 |
| JP | 2003526277 T | 9/2003 |
| JP | 2009540697 | 11/2009 |
| JP | 4847583 | 10/2011 |
| RU | 2073913 C1 | 2/1997 |
| WO | WO9205556 | 4/1992 |
| WO | WO9307691 | 4/1993 |
| WO | WO9912364 A2 | 3/1999 |
| WO | WO9945678 A1 | 9/1999 |
| WO | WO0041376 | 7/2000 |
| WO | WO0167676 A2 | 9/2001 |
| WO | WO03041341 A1 | 5/2003 |
| WO | 03081860 | 10/2003 |
| WO | WO2005101731 | 10/2005 |
| WO | WO2007143679 | 12/2007 |
| WO | WO2007143731 | 12/2007 |

OTHER PUBLICATIONS

International Search Report—PCT/US07/070614, International Search Authority—European Patent Office—Dec. 3, 2007.

Written Opinion—PCT/US2007/070614, International Search Authority, European Patent Office, Dec. 3, 2007.

Translation of Office Action in chinese application 200780015399.9 corresponding to U.S. Appl. No. 11/759,883, citing CN1437809A dated Jan. 6, 2011.

Translation of Office Action in Chinese application 200780020889.8 corresponding to U.S. Appl. No. 11/759,910, citing CN1437809 dated Mar. 14, 2011.

application 11/759,910, citing CN1437809 dated 2011-03-14 (061351CN).

* cited by examiner

METHOD AND APPARATUS FOR USING SHORT ADDRESSES IN A COMMUNICATION SYSTEM

RELATED APPLICATIONS

The present application claims the benefit of U.S. Provisional Patent Application Ser. No. 60/812,011 filed on Jun. 7, 2006, titled "A METHOD AND APPARATUS FOR L2TP TUNNELING" and the benefit of U.S. Provisional Patent Application Ser. No. 60/812,012 filed on Jun. 7, 2006 titled "A METHOD AND APPARATUS FOR ADDRESSING MULTIPLE ACCESS POINTS" each of which is hereby expressly incorporated by reference.

FIELD

The present invention is directed to methods and apparatus for communications, and more particularly to methods and apparatus related to routing of packets.

BACKGROUND

Wireless communications systems often include a plurality of access points (APs) and/or other network elements in addition to access terminals, e.g., mobile or other end node devices. In many cases access terminals normally communicate with access points via wireless communications links while other elements in the network, e.g., APs, generally communicate via non-air links, e.g., fiber, cable or wire links. In the case of an airlink, bandwidth is a valuable constrained resource. Accordingly, it is desirable that communication over the airlink be performed in an efficient manner without excessive overhead.

Communications links between access points and/or other network devices are often less constrained from a bandwidth perspective than are air links between access terminals and access points. Accordingly, more overhead in terms of address length and/or other information may be acceptable over backhaul links than over an airlink.

While IP (Internet Protocol) addresses have been used successfully in networks for many years, they tend to include a fair number of bits. For communications over airlinks, it would be desirable if shorter addresses could be used over the airlink. However, it would be desirable that any changes to addresses used over the airlink not preclude the use of IP addresses over other links, e.g., backhaul links.

SUMMARY

Methods and apparatus for communicating between an access terminal (AT) and remote device via an access point (AP) are described. For communications over the air link, between an AP and an AT a short address corresponding to the remote device is used for routing packets to/from the remote device. This conserves air link resources. However, for communicating between the AP and the remote device a longer address, e.g., a full IP address corresponding to the remote device is used. The AT converts between the long and short addresses as information, e.g., packets are communicated between the remote device and the AT. The long address may be, for example, an IP address corresponding to the remote device used to route packets through a Layer 2 tunnel between the remote device and the AP. In some embodiments the remote device is a remote access point. The short address corresponding to the remote device is, in some embodiments, a shortened version of the full IP address corresponding to the remote device. However, the short address need not be a shortened version of the IP address used in the Layer 2 tunnel and may be any address assigned to correspond to the long, e.g., full length, IP address of the remote device but having fewer bits than the long address. In some embodiments, the AT which is communicating with the remote device is responsible for indicating to the AP the short address to be used over the airlink for a given long address. This may be done by the AT sending a signal, e.g., message, indicating that a particular long address maps to a particular short address supplied by the AT. In order to implement the mapping between long and short addresses, the AP stores the mapping information. When receiving a packet, e.g., a tunneled packet, including the long address corresponding to the remote device, the AP determines the corresponding short address from the look up table. The AP then transmits the packet payload to the AT using the short address of the remote device instead of the long address of the remote device. In this manner, the packet payload is communicated to the AT with the sender being identified using the short address as opposed to the full long address. The AT knows the mapping between the long and short addresses and is able to identify the original source of the packet payload. With regard to packets being directed to the remote device, the AT sends the packet payload with the short address of the remote device to the AP. The AP then looks up the short address, replaces it with the long, e.g., full IP address and then forwards the packet payload to the remote device using the long address of the remote device to indicate the destination of the packet being sent. In this manner, the AT can communicate over the airlink using fewer bits to identify the remote device as the intended destination of the packet contents than would be required if the long address was used over the airlink between the AT and AP.

An exemplary method of operating an access point to communicate information to an access terminal, in accordance with some embodiments, comprises: receiving a packet from a remote device, said packet including a long address and information to be communicated; determining a short address corresponding to said long address to be used for communications over a communications link, said short address including fewer bits than said long address; and transmitting said information to be communicated with the short address to said access terminal. Another exemplary method of operating an access point to communicate information to a remote device, in accordance with some embodiments, comprises: receiving a packet from an access terminal, said packet including a short address and information to be communicated to a remote device; determining a long address corresponding to said short address to be used for communicating packet to said remote device, said long address including more bits than said short address; and sending said information to be communicated, with the long address, to said remote device. An exemplary access point for communicating information to an access terminal, comprises: a network interface for receiving a packet from a remote device via a network connection, said packet including a long address and information to be communicated; a long address to short address mapping module for determining a short address corresponding to said long address, said short address for use over a wireless communications link, said short address including fewer bits than said long address; a downlink packet generation module for generating a packet including said short address and said information to be communicated; and a wireless transmitter for transmitting, over said wireless communications link, downlink packets.

An exemplary method of operating an access terminal to communicate information to a remote device through an access point, in accordance with some embodiments, comprises: communicating to said access point a message indicating a mapping between a short address used by said access terminal to identify the remote device and a long address used by said access point to identify said remote device; and transmitting information to be communicated to said remote device, over an airlink to said access point with the short address corresponding to said remote device. Another exemplary method of operating an access terminal to communicate information to a remote device through an access point, in accordance with some embodiments, comprises: communicating to said access point a message indicating a mapping between a short address used by said access terminal to identify the remote device and a long address used by said access point to identify said remote device; and transmitting information to be communicated to said remote device, over an airlink to said access point with the short address corresponding to said remote device. An exemplary access terminal for communicating information to a remote device through an access point, comprises: a mapping message generation module for generating a message indicating a mapping between a short address used by said access terminal to identify the remote device and a long address used by said access point to identify said remote device; a packet generation module for generating data packets directed to said remote device, said packets including a short address used by said access terminal to identify a remote device and information to be communicated to said remote device; and a wireless transmitter for transmitting said mapping information message and generated packets to said access point.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 4 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (iX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

Figure 1:
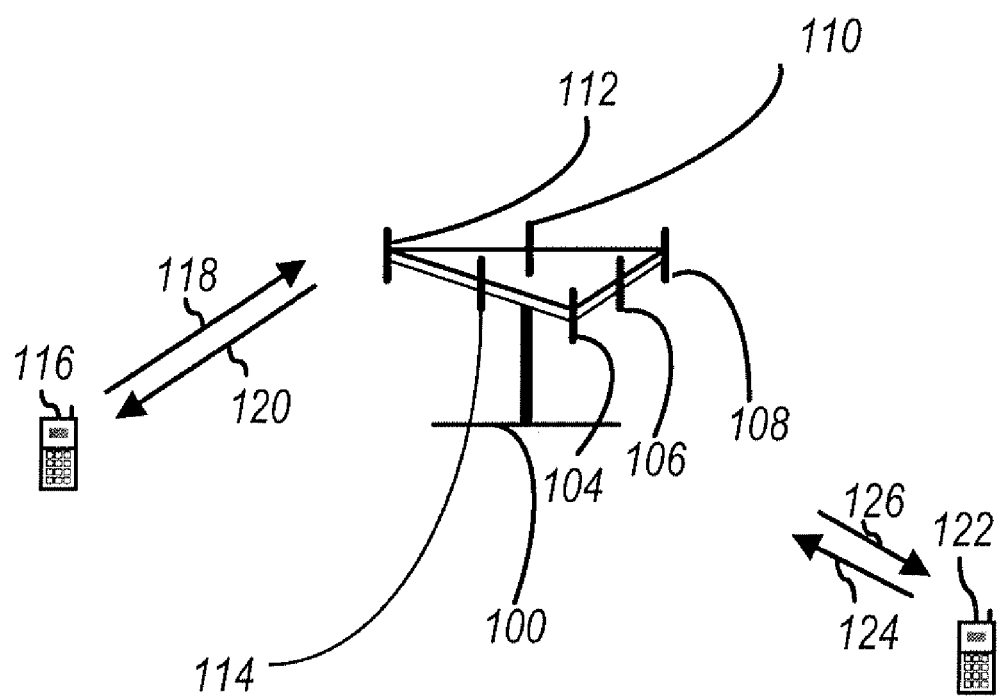
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 2:
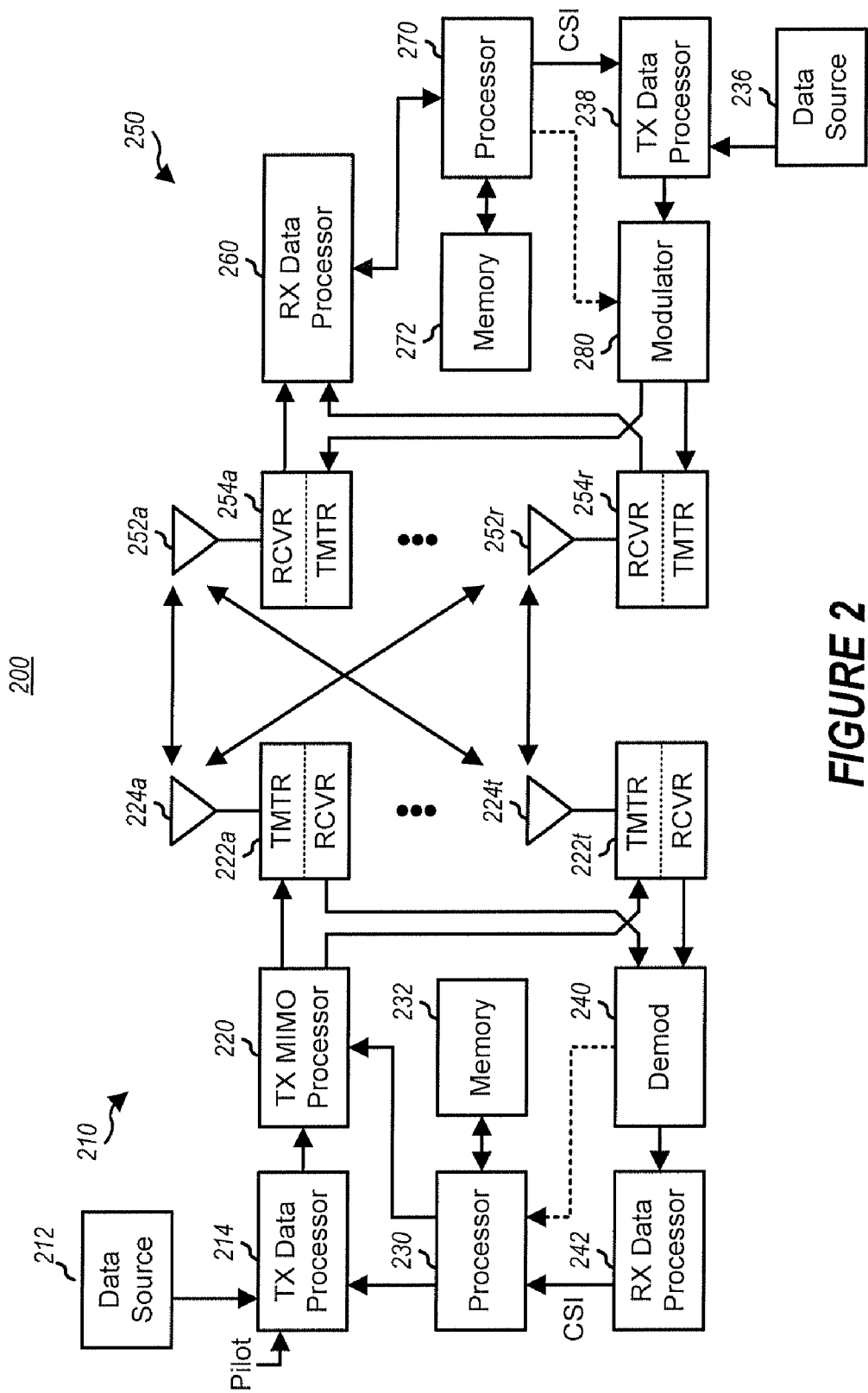
FIG. 2 is a block diagram of an exemplary communication system.

FIG. 2 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, . . . , 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, . . . , 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, . . . , 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 2 10.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and uses the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 3 and FIG. 4 respectively.

Figure 3:
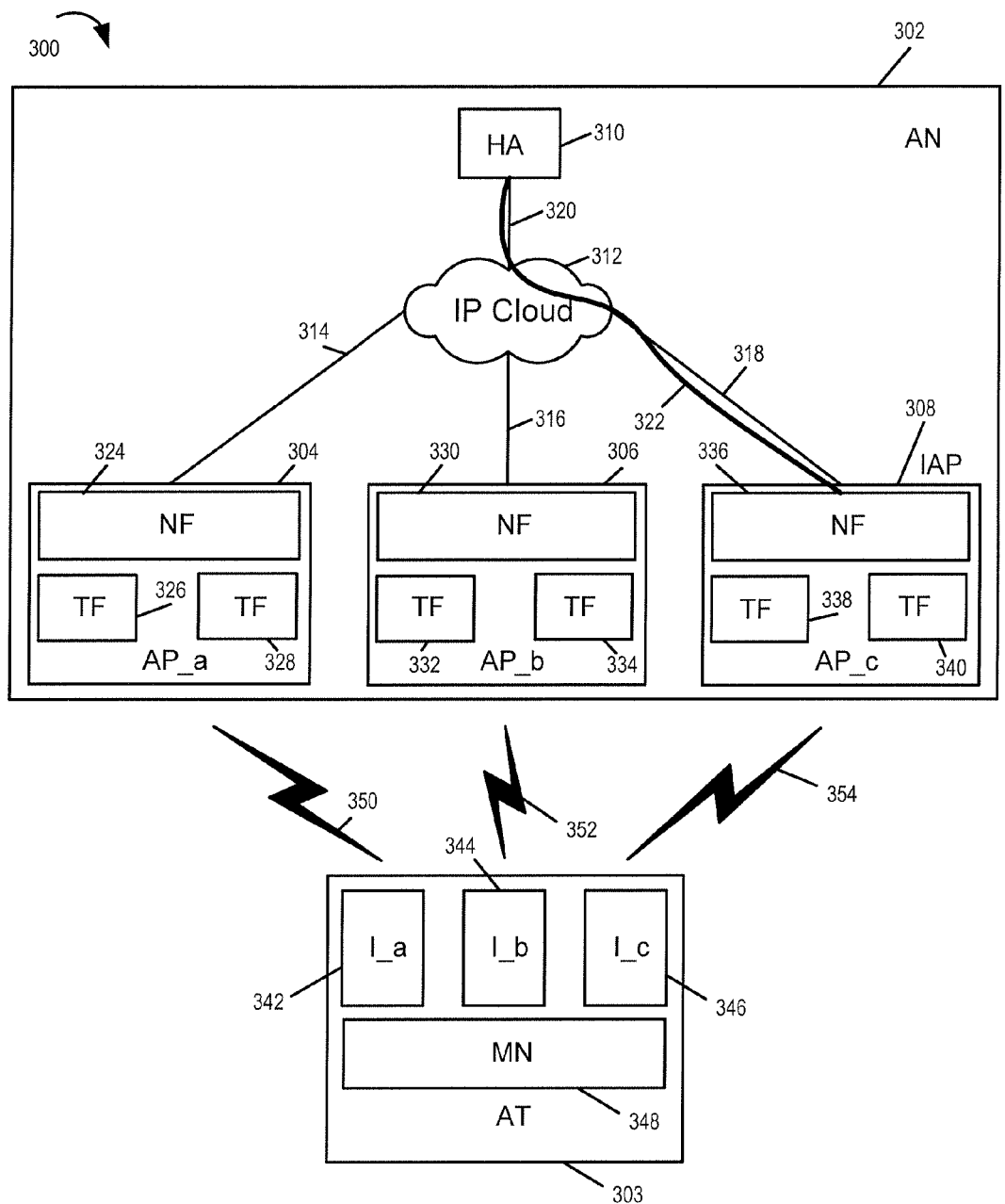
FIG. 3 illustrates an exemplary network including a distributed access network (AN) architecture and an access terminal (AT).
Figure 4:
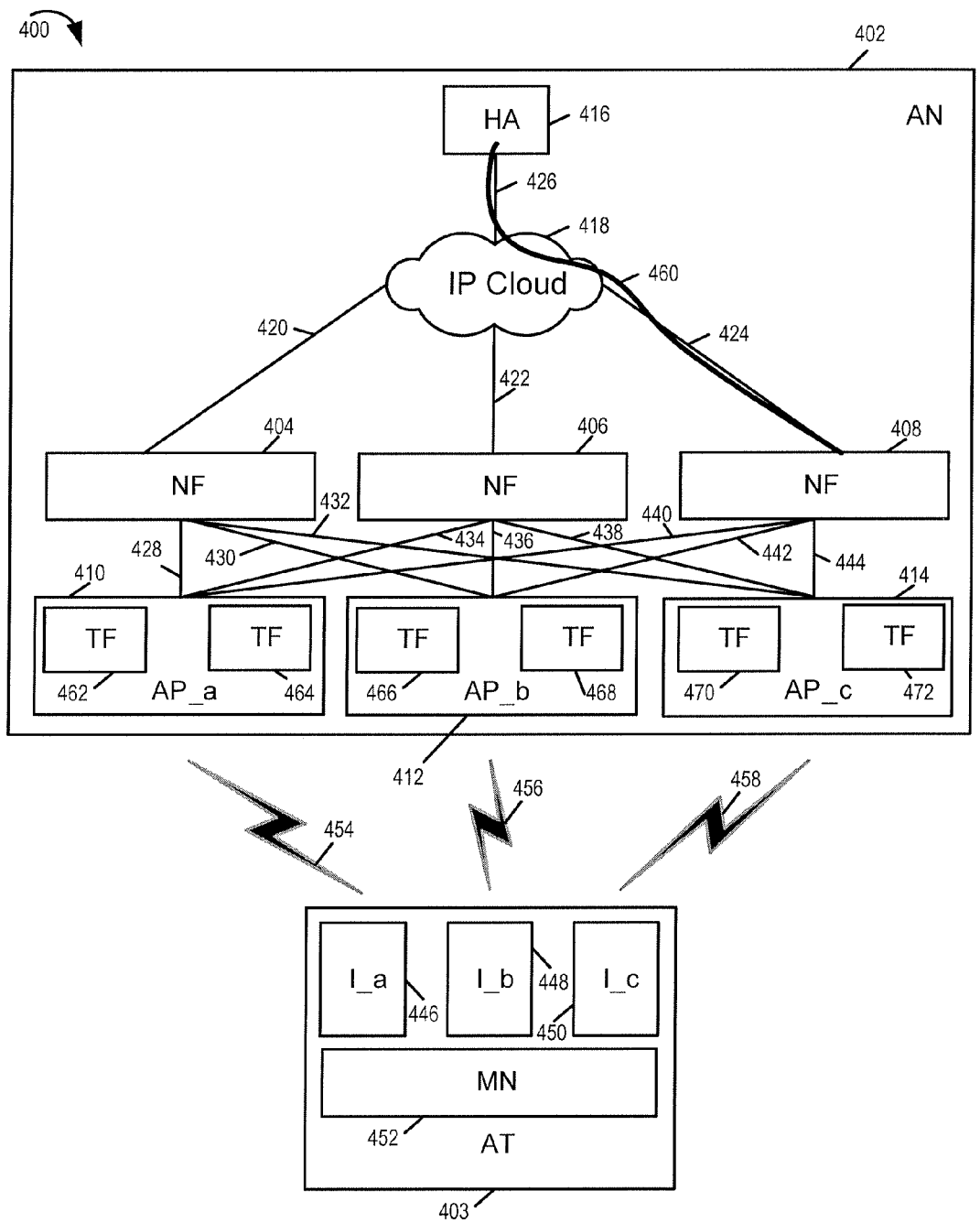

FIG. 3 illustrates an exemplary network 300 including a distributed AN 302 and an AT 303.

Distributed Network Architecture

In the distributed architecture shown in FIG. 3, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:

Network function (NF):

One per AP, and multiple NFs can serve a single AT.

A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.

The IAP may change (L3 handoff) to optimize routing of packets over the backhaul to the AT.

The IAP also performs the function of the session master for the AT. (In some embodiments, only the session master can perform session configuration, or change the session state.)

The NF acts as the controller for each of the TFs in the AP and performs functions like allocating, managing and tearing down resources for an AT at the TF.

Transceiver functions (TF) or sector:

Multiple per AP, and multiple TFs can serve a single AT.

Provides the air interface attachment for the AT.

Can be different for the forward and reverse links.

Changes (L2 handoff) based on radio conditions.

In AN 302 APa 304 includes NF 324, TF 326 and TF 328. In AN 302 APb 306 includes NF 330, TF 332 and TF 334. In AN 302 APc 308 includes NF 336, TF 338 and TF 340.

An AT includes a:

Interface I_x presented to the mobile node (MN) for each NF in the active set.

Mobile node (MN) to support IP layer mobility at the access terminal.

APs communicate using a tunneling protocol defined over IP. The tunnel is an IP-in-IP tunnel for the data plane and an L2TP tunnel for the control plane.

Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303, can be, and sometimes is, coupled to AP_c 308 via wireless link 354.

FIG. 4 illustrates an exemplary network 400 including a distributed AN 402 and an AT 403.

Centralized Network Architecture

In a centralized architecture shown in FIG. 4, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 4, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

Access and Active Set Management

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID (Media Access Control Identifier) and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

State and Handoff

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 3 and FIG. 4), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature for every system regardless of the network architecture since it simplifies network interfaces and should also improve the seamlessness of handoff.

Control vs. Awareness of Handoff

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MIPv6) in the AT. The mobility latency can be solved by forwarding data using tunnels between the current and previous forward link serving sector, as well as possibly using bicasting, where the data is sent to multiple NFs in the active set simultaneously.

L2 and L3 Handoff

In SimpleRAN, there are two types of handoff:

Layer 2 or L2 handoff refers to changing of the forward link or reverse link serving sector (TF).

L3 handoff refers to changing of the IAP,

L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the SINR on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MIPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are two key ideas in the system design to ensure the QoS treatment for a mobile and its traffic is retained over each handoff mode:

Decoupling of L2 and L3 handoff

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, may communicate only with one carefully selected AP (serving AP). The problem considered here is the delivery of messages and data between the various APs in the system, such that the serving AP can deliver messages to and from the AT.

APs can exchange data over an L2TP (layer two tunneling protocol) tunnel. If AP1 has to send a message or data to the AT, while AP2 is the serving AP, then AP1 first uses the L2TP tunnel to deliver the packet to AP2, and AP2 delivers this packet to the AT using a mechanism including the use of an identifier bit, e.g., a reprocess bit.

Similarly, if the AT has to send a message or data to AP1, while AP2 is serving, it sends the message to AP2 with a remote bit set, and AP2 sends this packet to AP1 via the L2TP tunnel.

The L2TP header includes the following fields
1. UserID: This is the address of the user to which the L2TP packet is addressed
2. ForwardOrReverse: This field identifies if the AT is the destination or the source of the packet.
3. FlowID: In one design, this field may be present only in forward link packets (packets destined to the AT), and it identifies the flow that the serving AP should use to deliver the packet to the AT
4. SecurityField: In one design, this field may be present only in reverse link packets (packets originated at the AT). The SecurityField may include an IsSecure bit, a KeyIndex field (to identify the keys used for security operation) and a CryptoSync field.

In an aspect, forward Link L2TP Packets are communicated. Here we describe the process used by an AP to send and receive a forward link L2TP packet.

An AP sends a forward link L2TP packet when it has data or a message to send to the AT. The AP forms the appropriate header and sends the L2TP packet to the serving AP (or if it does not know the identity of the serving AP, possibly by routing the packet through a central node—the IAP).

When an AP receives a forward link L2TP packet, it does the following steps

1. If the AP is not serving for the given UserID (in the L2TP header), it forwards the packet to the current serving AP (possibly by routing the packet through a central node—the IAP)
2. If the AP is serving for the given UserID, it delivers the packet to the AT using the RLP flow and associated QoS attributes for the given FlowID (in the L2TP header).

In an aspect, reverse Link L2TP Packets are communicated. Here we describe the process used by an AP to send and receive a reverse link L2TP packet.

An AP sends a reverse link L2TP packet when it receives a packet from the AT, and the remote bit is set for that packet. The first step for the AP sending the L2TP packet is address determination.

Address Determination: If the remote bit for the packet is set, the packet also includes an address field to identify which AP this packet should be delivered to (target AP). The receiving AP maps the address field to the IP address of the AP. This mapping may be established by 1. An AT assisted method wherein messages describing a mapping are sent from the AT to the AP, and the mapping information is then used by the AP to map between the address used over the airlink and the IP address.
2. A network assisted method whereby mapping information provided by a central entity or by the target AP is used.
3. A PilotPN based method. In this case the address field may simply be equal to the PilotPN (or some upper bits of the PilotPN) of the AP corresponding to the address. The receiving AP knows the PilotPN and IP addresses of all neighboring APs as part of the network configuration (which itself may be network assisted) and uses this information to map between the PN based address and corresponding IP address.
4. An IAP address method where a special address type is used by the AT to identify the AP which is the Internet attachment point for the AT. Each AP in an active set of APs corresponding to an AT knows the IP address of the IAP for the particular AT and can map between the IAP address and IP address of the AT's IAP.

After address determination, the AP sending the L2TP packet may also insert security related fields if needed, and as determined by the security design. When an AP receives a reverse link L2TP packet, it does the following steps 1. If the AP is not serving the given UserID indicated in a received packet (in the L2TP tunnel), it ignores the packet
2. If the AP is serving the given UserID of the received packet, it processes the packet as if the packet were received from its own MAC (Media Access Control) layer. The processing of the packet may depend on the SecurityField received in the L2TP tunnel.

Figure 5:
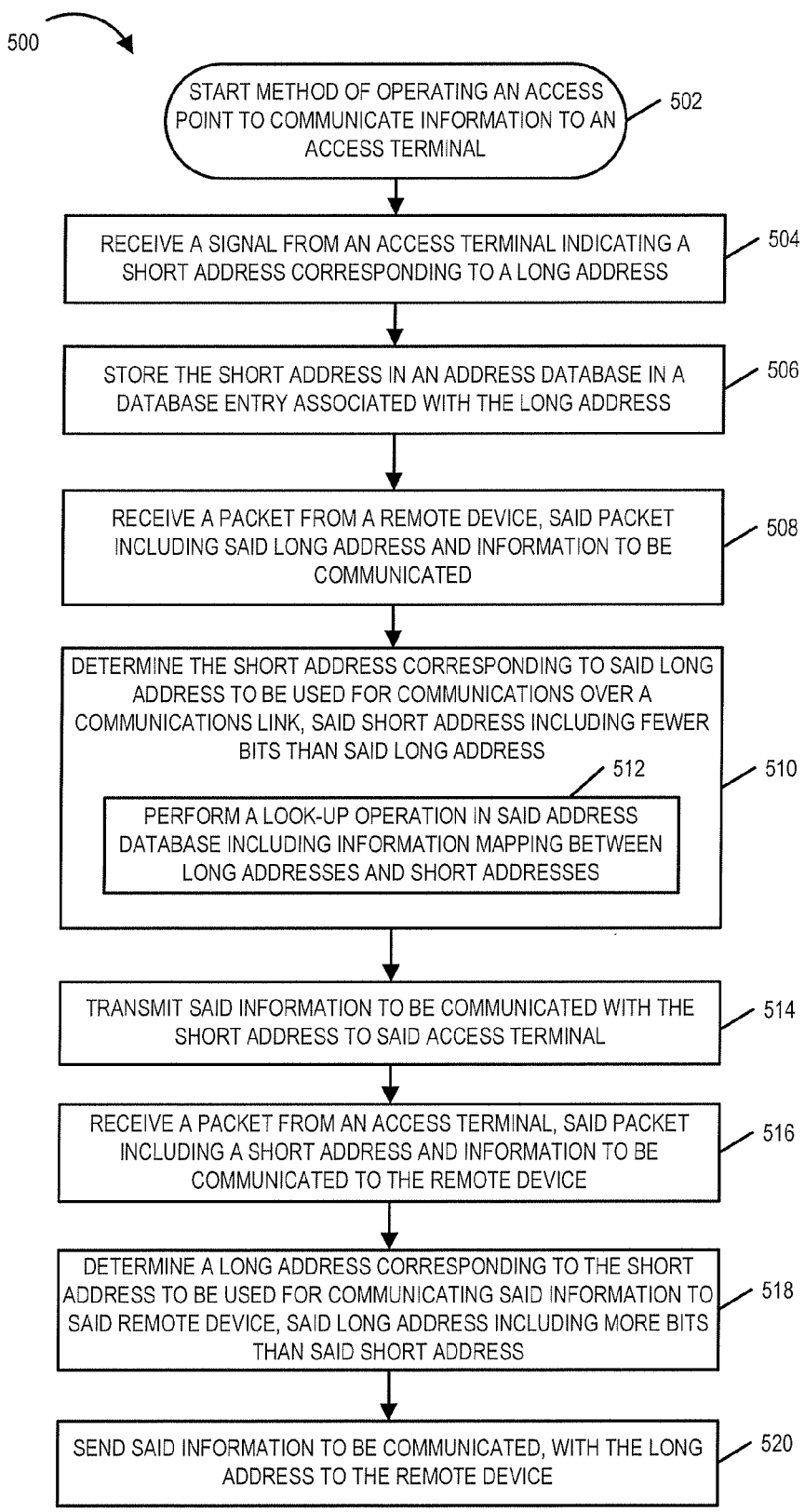
FIG. 5 is a flowchart of an exemplary method of operating an access point to communicate information to an access terminal.

FIG. 5 is a flowchart 500 of an exemplary method of operating an access point to communicate information to an access terminal. Operation starts in step 502 where the access point is powered on and initialized and proceeds to step 504. In step 504, the access point receives a signal from an access terminal indicating a short address corresponding to a long address. Then, in step 506, the access point stores the short address in an address database in a database entry associated with the long address. Operation proceeds from step 506 to step 508. In step 508, the access point receives a packet from a remote device, said packet including said long address and information to be communicated. Operation proceeds from step 508 to step 510, in which the access point determines the short address corresponding to said long address to be used for communications over a communication link, said short address including fewer bits than said long address. Step 510 includes sub-step 512 in which the access point performs a look-up operation in said address database including information mapping between long addresses and short addresses.

Operation proceeds from step 510 to step 514. In step 514, the access point transmits said information to be communicated with the short address to said access terminal. In some embodiments, the remote device is a remote access point and transmitting said information to be communicated with the short address to said access terminal includes transmitting a packet payload included with said received packet with a header that includes said shortened address. In some embodiments, the header that includes said shortened address is one of i) a PCP header and ii) an RLP header.

Operation proceeds from step 514 to step 516. In step 516, the access point receives a packet from an access terminal, said packet including a short address and information to be communicated to the remote device. Then, in step 518 the access point determines a long address corresponding to the short address to be used for communicating said information to said remote device, said long address including more bits than said short address. Operation proceeds from step 518 to step 520, in which the access point sends the information to be communicated to the remote device with the long address to the remote device.

In some embodiments, the long address is an IP address. In some embodiments, the short address is a shortened version of the IP address. In various embodiments, the long address is used for routing packets from said remote device through a Layer 2 tunnel, and the short address is an address used for communicating packets over an airlink.

The remote device, in some embodiments, can be, and sometimes is, a remote access point. In some such embodiments, the remote access point can have previously served as the access terminal's active network point of attachment, and the access point can be currently serving as the access terminal's current active network point of attachment, and the short address is locally unique at the access point for said access terminal.

While described sequentially in FIG. 5 for purposes of illustration, it is to be understood that in some embodiments, uplink/downlink processing can be performed in parallel and/or on an ongoing basis as packets are received and transmitted.

Figure 6:
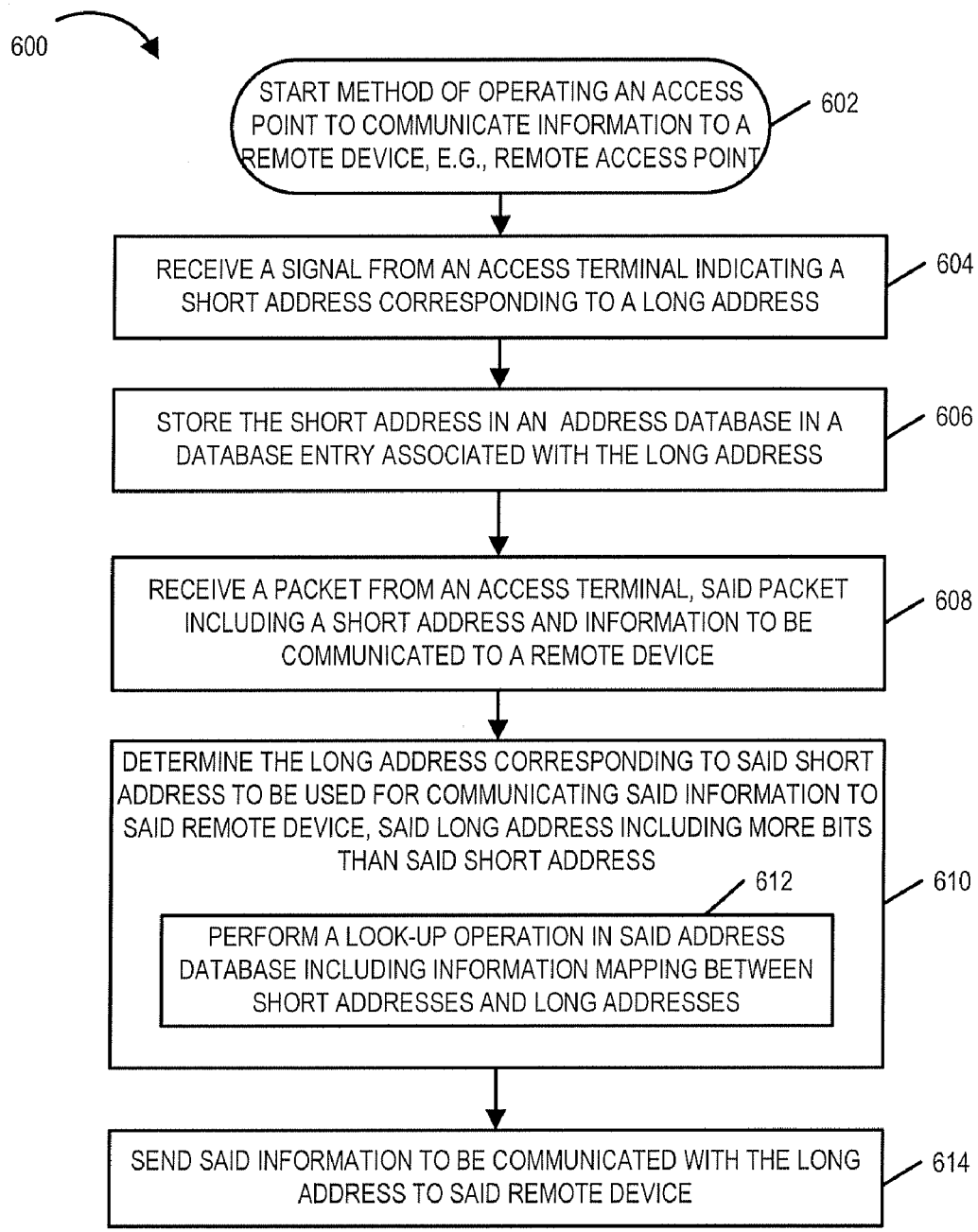
FIG. 6 is a flowchart of an exemplary method of operating an access point to communicate information to a remote device, e.g., a remote access point.

FIG. 6 is a flowchart 600 of an exemplary method of operating an access point to communicate information to a remote device, e.g., a remote access point. Operation starts in step 602, where the access point is powered on and initialized and proceeds to step 604. In step 604, the access point receives a signal from an access terminal indicating a short address corresponding to a long address. Operation proceeds from step 604 to step 606. In step 606, the access point stores the short address in an address database in a database entry associated with the long address.

Operation proceeds from step 606 to step 608. In step 608, the access point receives a packet from an access terminal, said packet including a short address and information to be communicated to a remote device. Then, in step 610, the access point determines the long address corresponding to said short address to be used for communicating the information to said remote device, said long address including more bits than said short address. Step 610 includes sub-step 612, in which the access point performs a look-up operation in said address database including information mapping between short addresses and long addresses. Operation proceeds from step 610 to step 614, in which the access point sends said information to be communicated with the long address to the remote device.

In various embodiments, the long address is an IP address. In some such embodiments, the short address is a shortened version of said IP address. In some embodiments, the long address is an address used for routing packets to said remote device through a Layer 2 tunnel and the short address is an address used for communicating packets over an airlink.

In some embodiments in which the remote device is a remote access point, the remote access point previously served as the access terminal's active network point of attachment, and the access point serves as the access terminal's current network point of attachment. In some such embodiments, the short address is locally unique at the access point for said access terminal.

Figure 7:
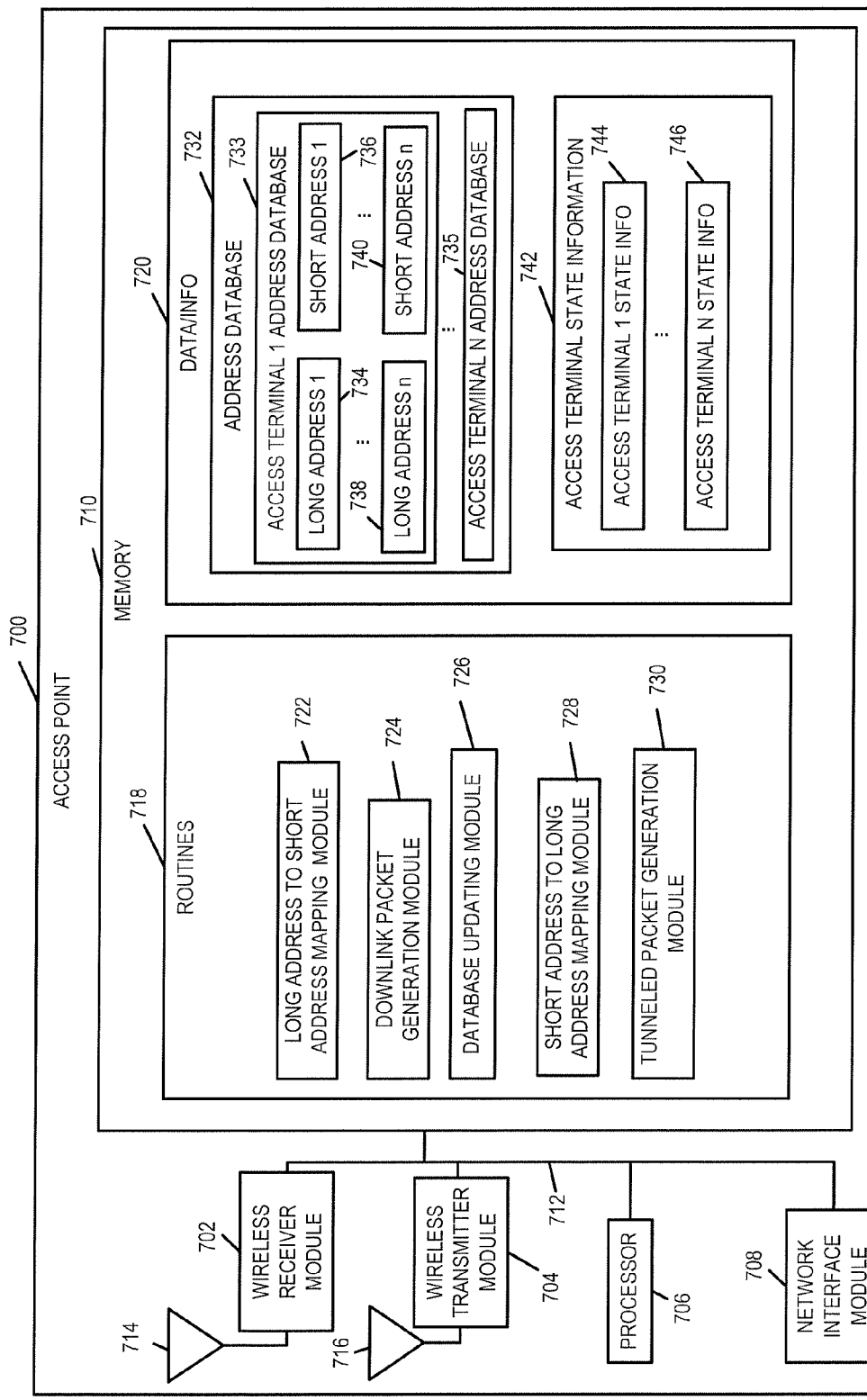
FIG. 7 is a drawing of an exemplary access point in accordance with various embodiments.

FIG. 7 is a drawing of an exemplary access point 700 in accordance with various embodiments. Exemplary access point 700 includes a wireless receiver module 702, a wireless transmitter module 704, a processor 706, a network interface module 708 and memory 710 coupled together via a bus 712 over which the various elements may interchange data and information. Memory 710 includes routines 718 and data/information 720. The processor 706, e.g., a CPU, executes the routines and uses the data/information 720 in memory 710 to control the operation of the access point and implement methods, e.g., the methods of flowchart 500 of FIG. 5 and the method of flowchart 600 of FIG. 6.

Wireless receiver module 702, e.g., an OFDM receiver, is coupled to receive antenna 714 via which the access point receives uplink signals from access terminals. Wireless receiver module 702 receives a signal from an access terminal indicating a short address corresponding to a long address. Wireless receiver module 702 also receives a packet from an access terminal, said packet including a short address and information to be communicated to a remote device, e.g., a remote access point.

Wireless transmitter module 704, e.g., an OFDM transmitter, is coupled to transmit antenna 716, via which the access point transmits downlink signals to access terminals. Wireless transmitter module 704 transmits over a wireless communications link downlink packets.

In some embodiments, the same antenna is used for transmission and reception. In some embodiments multiple antennas and/or multiple antenna elements are uses for reception. In some embodiments multiple antennas and/or multiple antenna elements are uses for transmission. In some embodiments at least some of the same antennas or antenna elements are used for both transmission and reception. In some embodiments, the access point uses MIMO techniques.

Network interface module 708 is coupled to other network nodes, e.g., other access points, AAA node, home agent node, etc, and/or the Internet via network link 709. Network interface module 708 receives a packet from a remote device, e.g., a remote access point, via a network connection 709, said packet including a long address and information to be communicated. In some embodiments, the network interface 708 is coupled to the remote device by a backhaul link, and the remote device is a remote access point.

Routines 718 include a long address to short address mapping module 722, a downlink packet generation module 724, a database updating module 726, a short address to long address mapping module 728 and a tunneled packet generation module 730. Data information 720 includes an address database 732 and access terminal state information 742. Address database 732 includes a plurality of address databases corresponding to different access terminals (access terminal 1 address database 733, . . . , access terminal N address database 735). Access terminal 1 address database 733 includes corresponding pairs of long addresses and short addresses ((long address 1 734, short address 1 736), . . . , (long address n 738, short address n 740)). In some embodiments, address mapping between long and short addresses is access terminal independent. In one such embodiment a single set of address database mapping information is maintained and utilized by the access point. The address database 732 is accessible to the long address to short address mapping module 722. The stored information in the address database 732 associates long addresses and short addresses. Access terminal state information 742 includes a plurality of sets of state information corresponding to different access terminals, e.g., different access terminals using the access point as a point of network attachment, (access terminal 1 state information 744, . . . , access terminal N state information 746). In various embodiments, the stored access terminal state information 742 includes state information including information indicating that the access point 700 is an access terminal's current active network point of attachment.

Long address to short address mapping module 722 determines a short address corresponding to a long address, said short address for use over a wireless communications link, said short address including fewer bits than said long address. Downlink packet generation module 724 generates a downlink packet including a short address and information to be communicated. Database updating module 726 stores a short address in the address database 732 in a database entry associated with the long address. Short address to long address mapping module 728 determines a long address corresponding to a short address to be used for communicating information to a remote device, said long address including more bits than said short address. Tunneled packet generation module 730 generates a packet to be sent to a remote device, said tunneled packet generation module 730 generating a packet including: i) a long address determined from a short address included in a received packet and ii) information to be communicated which was communicated in the received packet that included the short address used to determine the long address.

In various embodiments, the long address is an IP address. In some such embodiments, the short address is a shortened version of the IP address. In some embodiments, the long address is an address used for routing packets between a remote device and the access point through a Layer 2 tunnel, and the short address is an address used for communicating packets over an airlink. In some embodiments, the short address is locally unique at access point 700 for an access terminal.

Figure 8:
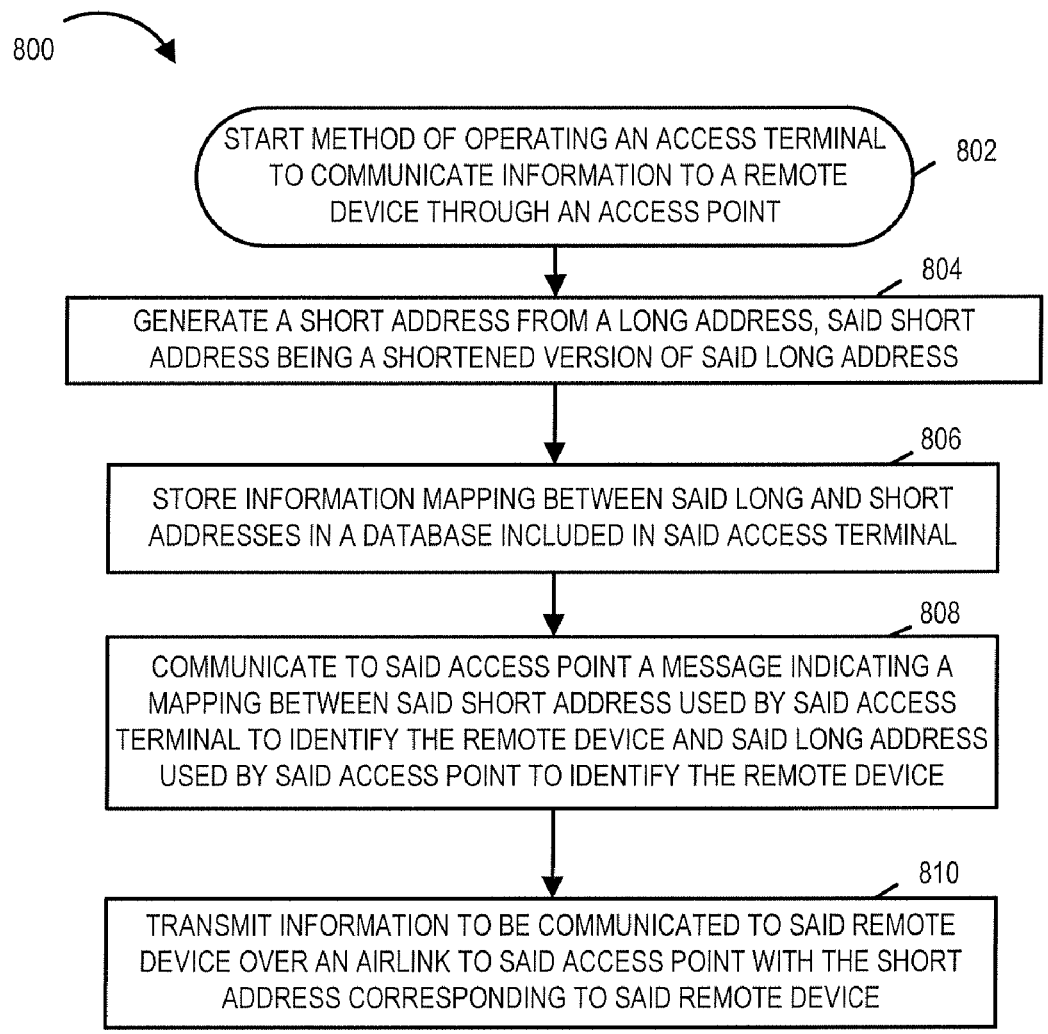
FIG. 8 is a flowchart of an exemplary method of operating an access terminal to communicate information to a remote device through an access point.

FIG. 8 is a flowchart 800 of an exemplary method of operating an access terminal to communicate information to a remote device through an access point. Operation starts in step 802, where the access terminal is powered on and initialized and proceeds to step 804. In step 804, the access terminal generates a short address from a long address, said short address being a shortened version of said long address. Operation proceeds from step 804 to step 806. In step 806, the access terminal stores information mapping between said long and short addresses in a database included in said access terminal.

Then, in step 808, the access terminal communicates to said access point a message indicating a mapping between said short address used by said access terminal to identify said remote device and said long address used by said access point to identify the remote device. Operation proceeds from step 808 to step 810. In step 810, the access terminal transmits information to be communicated to the remote device over an airlink to said access point with the short address corresponding to the remote device.

The long address is, in some embodiments, an IP address used for communicating packets through a Layer 2 tunnel between said access point and said remote device. In various embodiments, the remote device is a remote access point. In some such embodiments, the remote access point previously served as the access terminal's active network point of attachment and the access point serves as the access terminal's current active network point of attachment. In various embodiments, the short address is locally unique at the access point for said access terminal.

Figure 9:
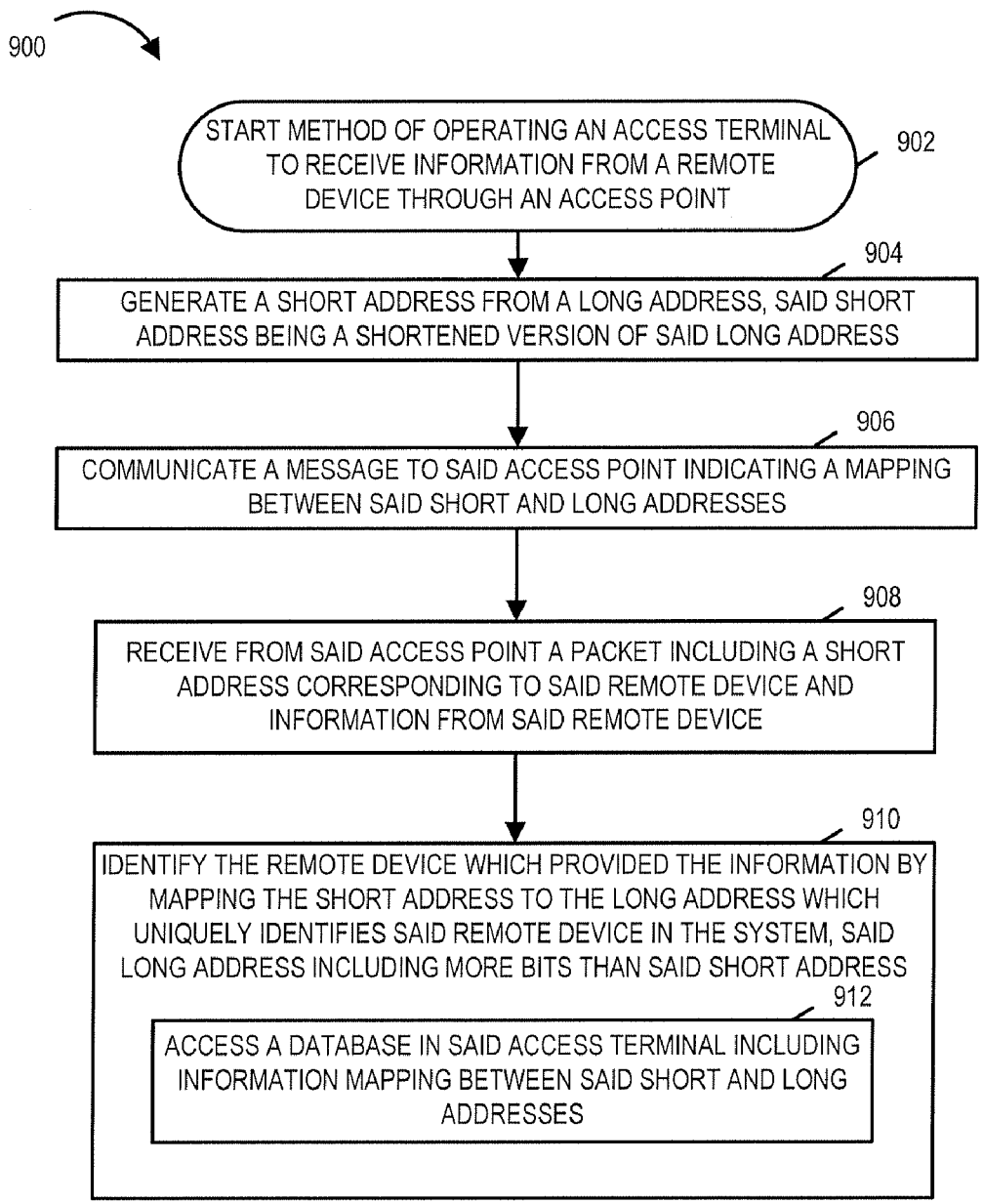
FIG. 9 is a flowchart of an exemplary method of operating an access terminal to receive information from a remote device through an access point.

FIG. 9 is a flowchart 900 of an exemplary method of operating an access terminal to receive information from a remote device through an access point. Operation starts in step 902, where the access terminal is powered on and initialized and proceeds to step 904. In step 904, the access terminal generates a short address from a long address, said short address being a shortened version of said long address. Then, in step 906, the access terminal communicates a message to said access point indicating a mapping between said short and long addresses. Operation proceeds from step 906 to step 908. In step 908 the access terminal receives from said access point a packet including a short address corresponding to said remote device and information from said remote device. Operation proceeds from step 908 to step 910. In step 910, the access terminal identifies the remote device which provided the information by mapping the short address to the long address which uniquely identifies said remote device in the system, said long address including more bits than said short address. Step 910 includes sub-step 912 in which the access terminal accesses a database in said access terminal including information mapping between said short and long addresses.

In various embodiments, the long address is an IP address used for communicating packets through a Layer 2 tunnel between the access point and the remote device. In some embodiments, the remote device is a remote access point. In some such embodiments, the remote access point previously served as the access terminal's active network point of attachment, and the access point serves as the access terminal's current active network point of attachment. In various embodiments, the short address is locally unique at the access point for said access terminal.

Figure 10:
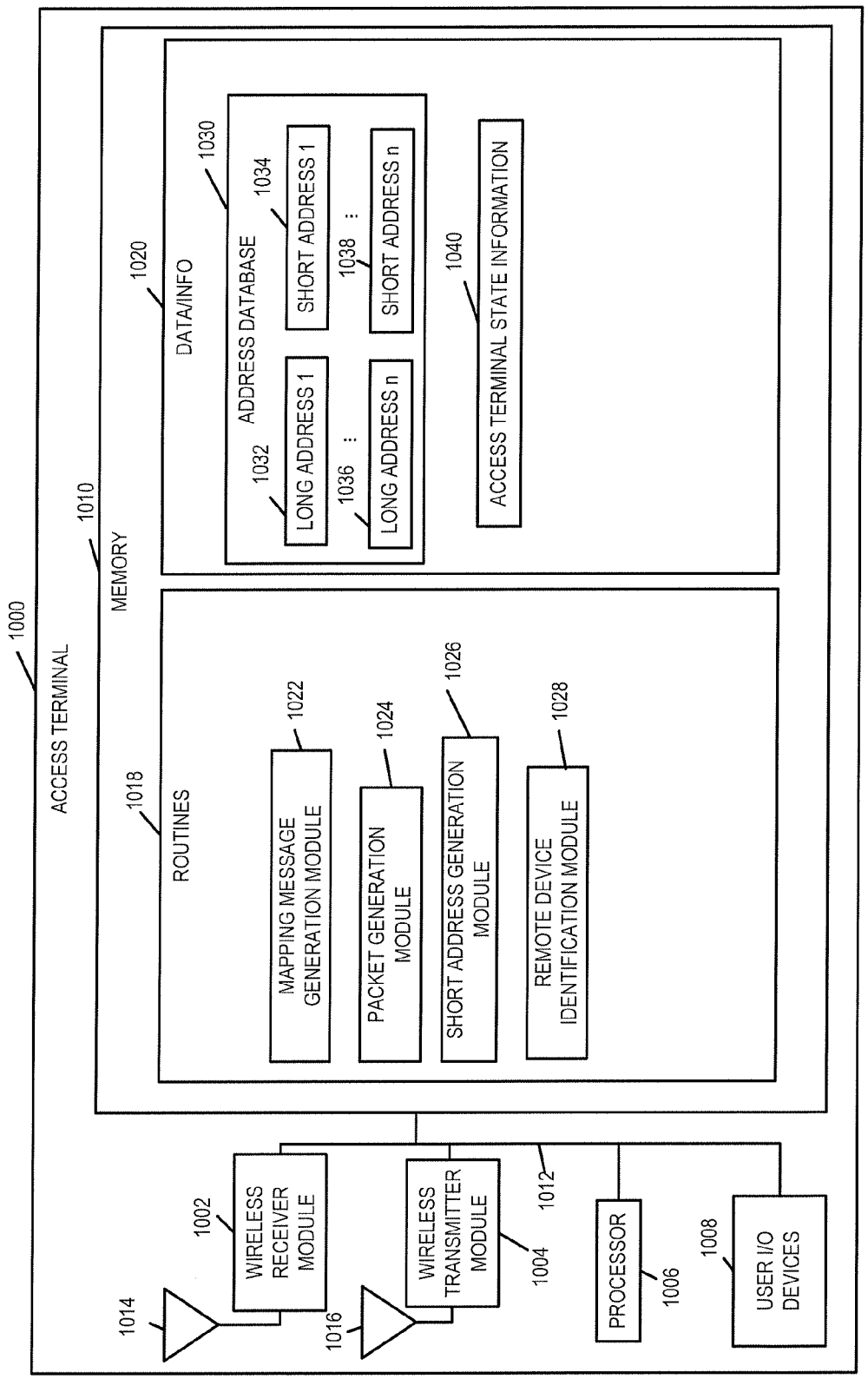
FIG. 10 is a drawing of an exemplary access terminal in accordance with various embodiments.

FIG. 10 is a drawing of an exemplary access terminal 1000 in accordance with various embodiments. Exemplary access terminal 1000 can, and sometimes does, communicate information to a remote device through an access point. Exemplary access terminal 1000 includes a wireless receiver module 1002, a wireless transmitter module 1004, a processor 1006, user I/O devices 1008 and memory 1010 coupled together via a bus 1012 over which the various elements may interchange data and information. Memory 1010 includes routines 1018 and data/information 1020. The processor 1006, e.g., a CPU, executes the routines 1018 and uses the data/information 1020 in memory 1010 to control the operation of the access terminal and implement methods, e.g., the methods of flowchart 800 of FIG. 8 and flowchart 900 of FIG. 9.

Wireless receiver module 1002 is coupled to receive antenna 1014 via which the access terminal 1000 receives downlink signals from access points. Wireless receiver module 1002 receives from an access point, e.g., its current serving access point, a packet including a short address corresponding to a remote device and information from the remote device.

Wireless transmitter module 1004 is coupled to transmit antenna 1016 via which the access terminal 1000 transmits uplink signals to access points. Uplink signals transmitted by the wireless transmitter module 1004 include a mapping information message and generated packets.

In some embodiments, the same antenna is used for transmission and reception. In some embodiments multiple antennas and/or multiple antenna elements are uses for reception. In some embodiments multiple antenna and/or multiple antenna elements are uses for transmission. In some embodiments at least some of the same antennas or antenna elements are used for both transmission and reception. In some embodiments, the access terminal uses MIMO techniques.

User I/O device 1008 include, e.g., microphone, keyboard, keypad, switches, camera, speaker, display, etc. User I/O devices 1008 allow a user of access terminal 1000 to input data/information, access output data/information, and control at least some functions of the access terminal 1000, e.g., initiate a communications session with a peer node, e.g., another access terminal.

Routines 1018 include a mapping message generation module 1022, a packet generation module 1024, a short address generation module 1026 and a remote device identification module 1028. Data/information 1020 includes an address database 1030 and access terminal state information 1040. Address database 1030 includes corresponding pairs of long addresses and short addresses ((long address 1 1032, short address 1 1034), . . . , (long address n 1036, short address n 1038)). The stored information in the address database 1030 includes mapping between short and long addresses, e.g., associates long addresses and short addresses. In various embodiments, at times, the stored access terminal state information 1040 includes state information including information indicating which access point is the current point of network attachment for access terminal 1000 and which access point is the previous point of network attachment for access terminal 1000.

Mapping message generation module 1022 generates a message indicating a mapping between a short address used by an access terminal to identify a remote device and a long address used by an access point to identify the remote device. Packet generation module 1024 generates data packets directed to a remote device, said packets including a short address used by the access terminal 1000 to identify a remote device and information to be communicated to said remote device. Short address generation module 1026 shortens a long address to generate a corresponding short address therefrom. Remote device identification module 1028 identifies the remote device which provided the information included in a packet received by the wireless receiver module 1002 by mapping the short address to a longer address which uniquely identifies the remote device in the system.

In various embodiments, the long address is an IP address used for communicating packets through a Layer 2 tunnel between an access point and a remote device. In some embodiments, the remote device is a remote access point, e.g., from the perspective of the access terminal 1000. In some such embodiments, the remote access point previously served as the access terminal's 1000 active point of network attachment and the access point serves as the access terminal's 1000 current active network point of attachment. In some such embodiments, the short address is locally unique at the access point for said access terminal.

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating an access point with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating an access point to communicate information to an access terminal, the method comprising:
receiving at the access point a first packet from a remote device, said first packet including a first long address and information to be communicated;
determining a first short address corresponding to said first long address to be used for communications over a communications link, said first short address including fewer bits than said first long address;
transmitting said information to be communicated with the first short address to said access terminal;

receiving at the access point a second packet from the access terminal, said packet including a second short address and information to be communicated to the remote device;

determining a second long address based on said second short address to be used for communicating said information to said remote device, said second long address including more bits than said second short address;

sending said information to be communicated with the second long address to said remote device;

wherein said second short address and said second long address independently identify the remote device; and wherein said second short address includes a portion of said second long address and is different from a MAC address and an Ipv4 address.

2. The method of claim 1, wherein determining a first short address corresponding to said first long address includes:
performing a look-up operating in an address database including information mapping between long addresses and short addresses.

3. The method of claim 2, further comprising: prior to said step of determining a first short address corresponding to said first long address:
receiving a signal from said access terminal indicating the first short address corresponding to said first long address; and
storing the first short address in said address database in a database entry associated with said first long address.

4. The method of claim 3, wherein said first long address is an IP address.

5. The method of claim 4, wherein said first short address is a shortened version of said IP address.

6. The method of claim 3,
wherein said first long address is an address used for routing packets from said remote device through a Layer 2 tunnel; and
wherein said first short address is an address used for communicating packets over an airlink.

7. The method of claim 6,
wherein said remote device is a remote access point; and
wherein transmitting said information to be communicated with the first short address to said access terminal includes transmitting a packet payload included with said received packet with a header that includes said shortened address.

8. The method of claim 7,
wherein said remote access point previously served as said access terminal's active network point of attachment; and
wherein said access point serves as the access terminal's current active network point of attachment; and
wherein said first short address is locally unique at said access point for said access terminal.

9. An apparatus comprising:
a processor configured to:
receive at an access point a first packet from a remote device, said first packet including a first long address and information to be communicated;
determine a first short address corresponding to said first long address to be used for communications over a communications link, said first short address including fewer bits than said first long address;
transmit said information to be communicated with the first short address to an access terminal;
receive at the access point a second packet from the access terminal, said second packet including a second short address and information to be communicated to the remote device;
determine a second long address corresponding to said second short address to be used for communicating said information to said remote device, said second long address including more bits than said second short address;
send said information to be communicated with the second long address to said remote device;
wherein said second short address and said second long address independently identify the remote device; and
wherein said second short address includes a portion of said second long address and is different from a MAC address and an Ipv4 address.

10. The apparatus of claim 9, wherein said processor, in determining the first short address corresponding to said first long address, is further configured to:
perform a look-up operation in an address database including information mapping between long addresses and short addresses.

11. The apparatus of claim 10, wherein said processor is further configured to: prior to said step of determining the first short address corresponding to said first long address:
receive a signal from said access terminal indicating the first short address corresponding to said first long address; and
store the first short address in said address database in a database entry associated with said first long address.

12. The apparatus of claim 11,
wherein said first long address is an address used for routing packets from said remote device through a Layer 2 tunnel; and
wherein said first short address is an address used for communicating packets over an airlink.

13. A non-transitory computer readable medium embodying machine executable instructions for controlling an access point to implement a method of communicating with other communications devices, the method comprising:
receiving at the access point a first packet from a remote device, said packet including a first long address and information to be communicated;
determining a first short address corresponding to said first long address to be used for communications over a communications link, said first short address including fewer bits than said first long address;
transmitting said information to be communicated with the first short address to said access terminal;
receiving at the access point a second packet from the access terminal, said second packet including a second short address and information to be communicated to the remote device;
determining a second long address based on said second short address to be used for communicating said information to said remote device, said second long address including more bits than said second short address;
sending said information to be communicated with the second long address to said remote device;
wherein said second short address and said second long address independently identify the remote device; and
wherein said second short address includes a portion of said second long address and is different from a MAC address and an Ipv4 address.

14. A method of operating an access point to communicate information to a remote device, the method comprising:
receiving at the access point a packet from an access terminal, said packet including a short address and information to be communicated to the remote device;

determining a long address corresponding to said short address to be used for communicating said information to said remote device, said long address including more bits than said short address;
sending said information to be communicated, with the long address, to said remote device;
wherein said short address and said long address independently identify the remote device; and
wherein said short address includes a portion of said long address and is different from a MAC address and an Ipv4 address.

15. The method of claim 14, wherein determining a long address corresponding to said short address includes:
performing a look-up operation in an address database including information mapping between short and long addresses.

16. The method of claim 15, further comprising: prior to said step of determining a long address corresponding to said short address:
receiving a signal from said access terminal indicating the short address corresponding to said long address; and
storing the short address in said address database in a database entry associated with said long address.

17. The method of claim 16, wherein said long address is an IP address.

18. The method of claim 17, wherein said short address is a shortened version of said IP address.

19. The method of claim 16,
wherein said long address is an address used for routing packets to said remote device through a Layer 2 tunnel; and
wherein said short address is an address used for communicating packets over an airlink.

20. The method of claim 19,
wherein said remote device is a remote access point.

21. The method of claim 20,
wherein said remote access point previously served as said access terminal's active network point of attachment;
wherein said access point serves as the access terminal's current active network point of attachment; and
wherein said short address is locally unique at said access point for said access terminal.

22. An apparatus comprising:
a processor configured to:
receive at an access point a packet from an access terminal, said packet including a short address and information to be communicated to a remote device;
determine a long address corresponding to said short address to be used for communicating said information to said remote device, said long address including more bits than said short address;
send said information to be communicated, with the long address, to said remote device;
wherein said short address and said long address independently identify the remote device; and
wherein said short address includes a portion of said long address and is different from a MAC address and an Ipv4 address.

23. The apparatus of claim 22, wherein said processor, in determining a long address corresponding to said short address, is further configured to:
perform a look-up operation in an address database including information mapping between short and long addresses.

24. The apparatus of claim 23, wherein said processor is further configured to:
prior to said step of determining a long address corresponding to said short address:
receive a signal from said access terminal indicating the short address corresponding to said long address; and
store the short address in said address database in a database entry associated with said long address.

25. The apparatus of claim 24, wherein said long address is an IP address.

26. The apparatus of claim 24,
wherein said long address is an address used for routing packets to said remote device through a Layer 2 tunnel; and
wherein said short address is an address used for communicating packets over an airlink.

27. A non-transitory computer readable medium embodying machine executable instructions for controlling an access point to implement a method of communicating with other communications devices, the method comprising:
receiving at the access point a packet from an access terminal, said packet including a short address and information to be communicated to a remote device;
determining a long address corresponding to said short address to be used for communicating said information to said remote device, said long address including more bits than said short address;
sending said information to be communicated, with the long address, to said remote device;
wherein said short address and said long address independently identify the remote device; and
wherein said short address includes a portion of said long address and is different from a MAC address and an Ipv4 address.

28. An access point for communicating information to an access terminal, comprising:
a network interface for receiving a first packet from a remote device via a network connection, said first packet including a first long address and information to be communicated;
a long address to short address mapping module for determining a first short address corresponding to said first long address, said first short address for use over a wireless communications link, said first short address including fewer bits than said first long address;
a downlink packet generation module for generating a packet including said first short address and said information to be communicated;
a wireless transmitter for transmitting, over said wireless communications link, downlink packets;
a wireless receiver for receiving a second packet from an access terminal, said second packet including a second short address and information to be communicated to the remote device;
a short address to long address mapping module for determining a second long address corresponding to said second short address to be used for communicating information to said remote device, said second long address including more bits than said second short address;
wherein said second short address and said second long address independently identify the remote device; and
wherein said second short address includes a portion of said second long address and is different from a MAC address and an Ipv4 address.

29. The access point of claim 28, further comprising:
an address database, accessible to said long address to short address mapping module, including stored information associating long addresses and short addresses.

30. The access point of claim 29, further comprising:
a wireless receiver module for receiving a signal from said access terminal indicating the first short address corresponding to said first long address; and
a database updating module for storing the first short address in said address database in a database entry associated with said first long address.

31. The access point of claim 30, wherein said first long address is an IP address.

32. The access point of claim 31, wherein said first short address is a shortened version of said IP address.

33. The access point of claim 30,
wherein said first long address is an address used for routing packets between said remote device and said access point through a Layer 2 tunnel; and
wherein said first short address is an address used for communicating packets over an airlink.

34. The access point of claim 33,
wherein said network interface is coupled to said remote device by a backhaul link, said remote device being a remote access point.

35. The access point of claim 34, further comprising:
stored access terminal state information including state information including information indicating that said access point is said access terminal's current active network point of attachment; and
wherein said first short address is locally unique at said access point for said access terminal.

36. The access point of claim 28, further comprising:
a tunneled packet generation module for generating a packet to be sent to said remote device, said tunneled packet generation module generating a packet including: i) a long address determined from a short address included in a received packet and ii) information to be communicated which was included in the received packet that included the short address used to determine the long address.

37. An access point for communicating information to an access terminal, comprising:
network interface means for receiving a first packet from a remote device via a network connection, said first packet including a first long address and information to be communicated;
long address to short address mapping means for determining a first short address corresponding to said first long address, said first short address for use over a wireless communications link, said first short address including fewer bits than said first long address;
downlink packet generating means for generating a packet including said first short address and said information to be communicated;
means for transmitting, over said wireless communications link, downlink packets;
wireless receiver means for receiving a second packet from an access terminal, said second packet including a second short address and information to be communicated to the remote device;
short address to long address mapping means for determining a second long address corresponding to said second short address to be used for communicating information to said remote device, said second long address including more bits than said second short address;
wherein said second short address and said second long address independently identify the remote device; and
wherein said second short address includes a portion of said second long address and is different from a MAC address and an Ipv4 address.

38. A method of operating an access terminal to communicate information to a remote device through an access point, the method comprising:
communicating to said access point a message indicating a mapping between a short address used by said access terminal to identify the remote device and a long address used by said access point to identify said remote device;
transmitting information to be communicated to said remote device over an airlink to said access point with the short address corresponding to said remote device;
wherein the mapping information message allows the access point to determine the long address based on the short address for use in communicating information to the remote device;
wherein said short address and said long address independently identify the remote device; and
wherein said short address includes a portion of said long address and is different from a MAC address and an Ipv4 address.

39. The method of claim 38, further comprising:
storing information mapping between said short and long addresses in a database included in said access terminal.

40. The method of claim 39, further comprising:
prior to communicating said message indicating a mapping, generating said short address from said long address, said short address being a shortened version of said long address.

41. The method of claim 40, wherein said long address is an IP address used for communicating packets through a Layer 2 tunnel between said access point and said remote device.

42. The method of claim 41, wherein said remote device is a remote access point.

43. The method of claim 42,
wherein said remote access point previously served as said access terminal's active network point of attachment;
wherein said access point serves as the access terminal's current active network point of attachment; and
wherein said short address is locally unique at said access point for said access terminal.

44. An apparatus comprising:
a processor configured to:
communicate to an access point a message indicating a mapping between a short address used by an access terminal to identify a remote device and a long address used by said access point to identify said remote device;
transmit information to be communicated to said remote device over an airlink to said access point with the short address corresponding to said remote device;
wherein the mapping information message allows the access point to determine the long address based on the short address for use in communicating information to the remote device;
wherein said short address and said long address independently identify the remote device; and
wherein said short address includes a portion of said long address and is different from a MAC address and an Ipv4 address.

45. The apparatus of claim 44, wherein said processor is further configured to:
store information mapping between said short and long addresses in a database included in said access terminal.

46. The apparatus of claim 45, wherein said processor is further configured to:

prior to communicating said message indicating a mapping, generate said short address from said long address, said short address being a shortened version of said long address.

47. The apparatus of claim 46, wherein said long address is an IP address used for communicating packets through a Layer 2 tunnel between said access point and said remote device.

48. The apparatus of claim 47, wherein said remote device is a remote access point.

49. A non-transitory computer readable medium embodying machine executable instructions for controlling an access terminal to implement a method of communicating with other communications devices, the method comprising:
communicating to an access point a message indicating a mapping between a short address used by said access terminal to identify a remote device and a long address used by said access point to identify said remote device;
transmitting information to be communicated to said remote device over an airlink to said access point with the short address corresponding to said remote device;
wherein the mapping information message allows the access point to determine the long address based on the short address for use in communicating information to the remote device;
wherein said short address and said long address independently identify the remote device; and
wherein said short address includes a portion of said long address and is different from a MAC address and an Ipv4 address.

50. A method of operating an access terminal to receive information from a remote device through an access point, the method comprising:
receiving from said access point a packet including a short address corresponding to said remote device and information from said remote device;
identifying the remote device which provided the information by mapping the short address to a long address which uniquely identifies said remote device, said long address including more bits than said short address;
wherein said short address and said long address independently identify the remote device; and
wherein said short address includes a portion of said long address and is different from a MAC address and an Ipv4 address.

51. The method of claim 50, wherein identifying the remote device which provided the information includes:
accessing a database in said access terminal including information mapping between said short and long addresses.

52. The method of claim 51, further comprising:
prior to receiving said packet, communicating a message to said access point indicating a mapping between said short and long addresses.

53. The method of claim 52, further comprising, prior to communicating said message, generating said short address from said long address, said short address being a shortened version of said long address.

54. The method of claim 52, wherein said long address is an IP address used for communicating packets through a Layer 2 tunnel between said access point and said remote device.

55. The method of claim 54, wherein said remote device is a remote access point.

56. The method of claim 55,
wherein said remote access point previously served as said access terminal's active network point of attachment;
wherein said access point serves as the access terminal's current active network point of attachment; and
wherein said short address is locally unique at said access point for said access terminal.

57. An apparatus comprising:
a processor configured to:
receive from an access point a packet including a short address corresponding to a remote device and information from said remote device;
identify the remote device which provided the information by mapping the short address to a long address which uniquely identifies said remote device, said long address including more bits than said short address;
wherein said short address and said long address independently identify the remote device; and
wherein said short address includes a portion of said long address and is different from a MAC address and an Ipv4 address.

58. The apparatus of claim 57, wherein said processor, in identifying the remote device which provided the information, is further configured to:
access a database in an access terminal including information mapping between said short and long addresses.

59. The apparatus of claim 58, wherein said processor is further configured to:
prior to receiving said packet, communicate a message to said access point indicating a mapping between said short and long addresses.

60. The apparatus of claim 59, wherein said long address is an IP address used for communicating packets through a Layer 2 tunnel between said access point and said remote device.

61. The apparatus of claim 60, wherein said remote device is a remote access point.

62. A non-transitory computer readable medium embodying machine executable instructions for controlling an access terminal to implement a method of communicating with other communications devices, the method comprising:
receiving from an access point a packet including a short address corresponding to a remote device and information from said remote device;
identifying the remote device which provided the information by mapping the short address to a long address which uniquely identifies said remote device, said long address including more bits than said short address;
wherein said short address and said long address independently identify the remote device; and
wherein said short address includes a portion of said long address and is different from a MAC address and an Ipv4 address.

63. An access terminal for communicating information to a remote device through an access point, comprising:
a mapping message generation module for generating a message indicating a mapping between a short address used by said access terminal to identify the remote device and a long address used by said access point to identify said remote device;
a packet generation module for generating data packets directed to said remote device, said packets including a short address used by said access terminal to identify said remote device and information to be communicated to said remote device;
a wireless transmitter for transmitting said mapping information message and generated packets to said access point;

wherein the mapping information message allows the access point to determine the long address based on the short address for use in communicating information to the remote device;

wherein said short address and said long address independently identify the remote device; and wherein said short address includes a portion of said long address and is different from a MAC address and an Ipv4 address.

64. The access terminal of claim 63, further comprising:
a database including information mapping between said short and long addresses.

65. The access terminal of claim 64, further comprising:
a short address generation module for shortening a long address to generate a corresponding short address therefrom.

66. The access terminal of claim 65, wherein said long address is an IP address used for communicating packets through a Layer 2 tunnel between said access point and said remote device.

67. The access terminal of claim 66, wherein said remote device is a remote access point.

68. The access terminal of claim 67,
wherein said remote access point previously served as said access terminal's active network point of attachment;
wherein said access point serves as the access terminal's current active network point of attachment; and
wherein said short address is locally unique at said access point for said access terminal.

69. The access terminal of claim 63, further comprising:
a wireless receiver for receiving from said access point a packet including a short address corresponding to said remote device and information from said remote device; and a remote device identification module for identifying the remote device which provided the information included in the packet received by the wireless receiver by mapping the short address to a longer address which uniquely identifies said remote device in a system including said access point and said remote device.

70. An access terminal for communicating information to a remote device through an access point, comprising:

mapping message generation means for generating a message indicating a mapping between a short address used by said access terminal to identify the remote device and a long address used by said access point to identify said remote device;

packet generation means for generating data packets directed to said remote device, said packets including a short address used by said access terminal to identify said remote device and information to be communicated to said remote device;

means for transmitting said mapping information message and generated packets to said access point;

wherein the mapping information message allows the access point to determine the long address based on the short address for use in communicating information to the remote device;

wherein said short address and said long address independently identify the remote device; and wherein said short address includes a portion of said long address and is different from a MAC address and an Ipv4 address.

* * * * *